(12) United States Patent
Messano

(10) Patent No.: US 7,000,978 B1
(45) Date of Patent: Feb. 21, 2006

(54) THIN-SKIN ULTRALIGHT RECREATIONAL VEHICLE BODY SYSTEM

(76) Inventor: Frank Messano, 2100 Heyneman La., Simi Valley, CA (US) 93065

( * ) Notice: Subject to any disclaimer, the term of this patent is extended or adjusted under 35 U.S.C. 154(b) by 0 days.

(21) Appl. No.: 10/922,479

(22) Filed: Aug. 20, 2004

(51) Int. Cl.
  *B62D 33/00* (2006.01)

(52) U.S. Cl. .................................... 296/181.6; 296/205

(58) Field of Classification Search ............ 296/181.6, 296/156, 164, 168, 181.2, 203.01, 205
  See application file for complete search history.

(56) References Cited

U.S. PATENT DOCUMENTS

| | | | |
|---|---|---|---|
| 3,013,922 A * | 12/1961 | Fisher | 264/46.5 |
| 3,721,467 A | 3/1973 | Kerr | |
| 3,749,594 A * | 7/1973 | Bibb | 427/243 |
| 3,879,240 A | 4/1975 | Wall | |
| 4,440,434 A * | 4/1984 | Celli | 296/181.2 |
| 4,491,362 A | 1/1985 | Kennedy | |
| 4,598,008 A * | 7/1986 | Vogt et al. | 296/187.02 |
| 4,636,425 A | 1/1987 | Johnson | |
| 5,102,188 A * | 4/1992 | Yamane | 296/205 |
| 5,180,205 A | 1/1993 | Shoop | |
| 5,218,792 A | 6/1993 | Cooper | |
| 5,447,322 A * | 9/1995 | le Masson et al. | 280/602 |
| 5,589,243 A * | 12/1996 | Day | 428/56 |
| 5,653,494 A * | 8/1997 | Cleall et al. | 296/181.3 |
| 5,690,378 A | 11/1997 | Romesburg | |
| 5,700,118 A * | 12/1997 | Bennett et al. | 296/181.6 |
| 5,755,486 A * | 5/1998 | Wycech | 296/205 |
| 5,975,625 A | 11/1999 | Simplicean | |
| 6,135,542 A * | 10/2000 | Emmelmann et al. | 296/205 |
| 6,179,371 B1 | 1/2001 | Miller | |
| 6,199,940 B1 * | 3/2001 | Hopton et al. | 296/203.01 |
| 6,299,246 B1 | 10/2001 | Tomka | |
| 6,318,797 B1 * | 11/2001 | Bohm et al. | 296/210 |
| 6,378,933 B1 * | 4/2002 | Schoen et al. | 296/187.02 |
| 6,455,144 B1 * | 9/2002 | Wycech | 296/193.06 |
| 6,467,834 B1 * | 10/2002 | Barz et al. | 296/205 |
| 6,865,811 B1 * | 3/2005 | Wycech | 29/897.2 |
| 6,896,320 B1 * | 5/2005 | Kropfeld | 296/203.01 |
| 2001/0001687 A1 * | 5/2001 | Pokorzynski et al. | 428/318.6 |
| 2001/0007269 A1 * | 7/2001 | Hesch | 156/78 |
| 2002/0033299 A1 * | 3/2002 | Thomas | 180/377 |
| 2002/0066254 A1 * | 6/2002 | Ebbinghaus | 52/735.1 |
| 2002/0185064 A1 * | 12/2002 | Shutic | 118/309 |
| 2003/0019176 A1 * | 1/2003 | Anderson | 52/309.9 |
| 2003/0213544 A1 * | 11/2003 | Hesch | 156/79 |
| 2005/0184432 A1 * | 8/2005 | Mead | 264/272.15 |

OTHER PUBLICATIONS

None Known.

* cited by examiner

*Primary Examiner*—Kiran B. Patel

(57) ABSTRACT

An extremely light weight one-piece "thin-skin" molded RV body that can be manufactured without a heavy steel chassis frame, and which construction method minimizes costly hand labor . . . while lending itself to automated assembly line manufacturing processes as used in the automotive and sport boat industries. Aspects include a variable-height suspension system to decrease frontal area when towed, and which raises the body for use of slideouts; a streamlined storage nose cap that reduces air turbulence to increase fuel economy of the tow vehicle; pivoting road wheels to eliminate tire scrub on multiple axles; steerable wheels for backing in restricted areas; adjustable tongue weight sliding suspension; and a pivoting nose wheel to minimize tongue weight on the tow vehicle.

13 Claims, 13 Drawing Sheets

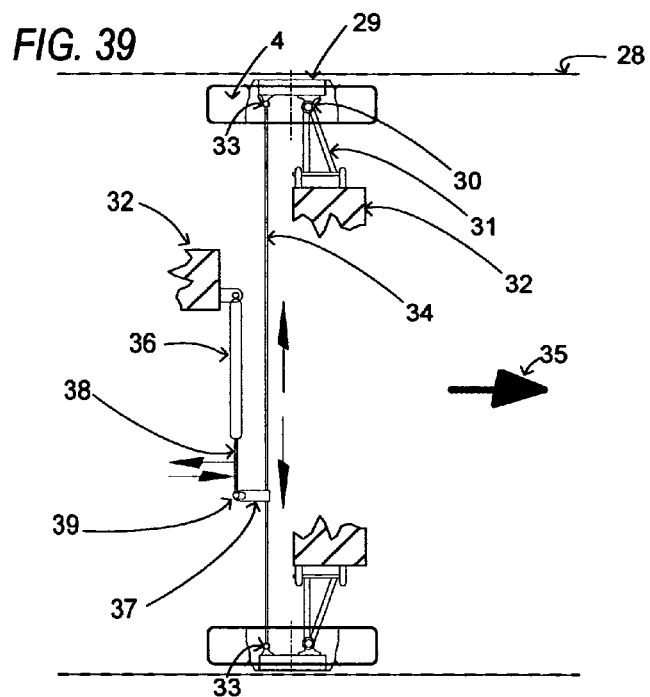
FIG. 39
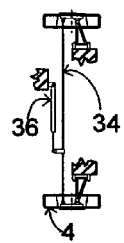 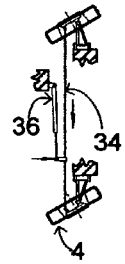 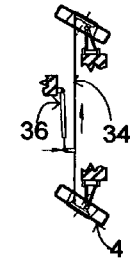  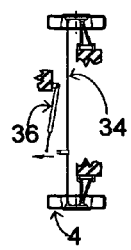 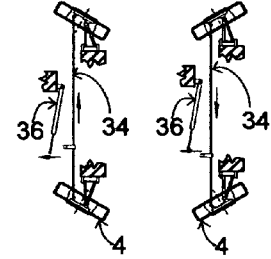
FIG. 40  FIG. 41  FIG. 42   FIG. 43  FIG. 44  FIG. 45

US 7,000,978 B1

THIN-SKIN ULTRALIGHT RECREATIONAL VEHICLE BODY SYSTEM

CROSS-REFERENCE TO RELATED APPLICATIONS

This Thin-Skin UltraLight Recreational Vehicle Body System patent application is related to my U.S. Pat. No. 6,237,988—STREAMLINE ROOFTOP DECK FOR MOTORHOMES, U.S. Pat. No. 6,425,625 ROOFTOP DECK SYSTEMS FOR VEHICLES, U.S. Pat. No. 6,679,543—RECREATIONAL VEHICLE FULL-LENGTH SLIDEOUT SYSTEM, and to my application Ser. No. 10/712,227—entitled AMPHIBIOUS RECREATIONAL VEHICLE.

FIELD OF THE INVENTION

The present invention relates to construction features and manufacturing methods for a molded land vehicle body, and more particularly for a thin exterior shell, lightweight body for recreational vehicles, trailers, motorhomes, coaches, buses, vans, delivery trucks, sport utility vehicles (SUVs), sports cars, and sports trucks. This group of vehicle types will be herein after referred to as "Recreational Trailers" for clarity of examples, but this term shall include all aforementioned vehicle types.

Moreover, this present invention incorporates improvements and elements from my previous patents and applications as listed above in the CROSS-REFERENCE TO RELATED APPLICATIONS, and which text on file with the US Patent Office is herein included as additional text within this application.

DISCUSSION OF THE PRIOR

Recreational Trailers require lightweight structures so that their weight can be towed by other vehicles, which are most often an automobile, truck, or SUV. The lighter weight that a Recreational Trailer can be built, the smaller and less powerful can be the vehicle to tow it. In the last few years, the great majority of vehicles sold in the United States and Canada are SUVs and pickup trucks . . . which sales now exceed those of automobiles. All these SUVs and pickup trucks can tow Recreational Trailers if their weight is low . . . which creates a massive potential market for the sales of Recreational Trailers.

In addition to the goal of Recreational Trailers being lightweight in order to be towed, they must also be streamlined with reduced frontal areas in order to conserve fuel when being towed at highway speeds.

And lastly, SUV and pickup truck styling has become as streamlined and sophisticated as automobile styling. The top end of the SUV market now has style leaders like Porsche, Mercedes Benz, Cadillac, Lincoln, BMW, and Lexus turning out flowing works of industrial art . . . while Recreational Trailers towed behind them are literally rectangular boxes on wheels. That is because the vast majority of Recreational trailers are of "box trailer construction", with only a few exceptions like the rounded aluminum Airstream that was introduced 50 years ago. Box trailer construction is built much like the construction of a shoebox with slab sides fastened to a slab top and to slab ends, sitting on a heavy steel frame. Typical examples of this box trailer construction are shown in U.S. Pat. No. 6,179,371 (Miller), and in U.S. Pat. No. 5,218,792 (Cooper).

And while the Airstream type thin aluminum body skin permits rounded shapes, it also requires massive amounts of costly labor to fasten the aluminum skins to its internal metal ribs with thousands of hand installed rivets. The resultant body, made up of several small pieces of overlapped aluminum skin panels, is prone to water leakage over time, and loses its lightweight "thin-skin" potential because a conventional heavy steel trailer chassis frame is required as a foundation for mounting the body to the road wheels.

A final type of construction is molded fiberglass where a thick and heavy self-supporting fiberglass (polyester, vinylester, epoxy, etc., resin) shell forms the structure of the Recreational Trailer, similar to the manner that a self-supporting fiberglass shell forms the structure of boat hulls. This type of exoskeleton thick-shell structure is shown in U.S. Pat. No. 5,690,378 (Romesburg), in U.S. Pat. No. 3,721,467 (Kerr), in U.S. Pat. No. 5,653,494 (Cleall), and in U.S. Pat. No. 3,879,240 (Wall). Romesburg's patent drawings well illustrate the typical exoskeleton mold and fiberglass part construction method. In this exoskeletal type construction, a female mold of the desired exterior shape of the vehicle body is constructed, into which layers of resins and fiberglass cloth or chopped strands (or other similar materials like carbon, Kevlar fabric, etc.) are applied and cured until hard. When the applied structure is cured and hard, it is removed and becomes an exoskeletal self-supporting body shell. In order to make the body shell self-supporting, the shell thickness must be thick and heavy. In an effort to lower the weight of the thick shell, a lighter weight core material (balsa wood, rigid foam, etc) is sometimes interspersed between the outermost resin layers and the innermost resins layers, but the resultant shell remains heavy because of the need of a thick outermost resin skin, and a second thick innermost skin to encapsulate the lighter weight core material. While this type of construction allows for a body shell that can be molded in well rounded sculptured shapes like those of automotive bodies, the resultant weight is still heavy.

Wall (U.S. Pat. No. 3,879,240) uses a variation of this thick-skin heavy fiberglass camper body shell structure, where a self-supporting heavy weight fiberglass camper body shell is first constructed in a mold, and then the fiberglass camper body is removed from the mold for installation of the interior furnishings. Once removed, the resultant self-supporting exoskeleton fiberglass camper body forms a second "self-contained female mold" which is no lighter than other similar fiberglass camper bodies. Wall then sprays layers of foamable polymer (much like whipped cream from an aerosol can) as an adhesive to bond loose furnishings and structures to the self-supporting exoskeleton fiberglass camper body. The final product results in lumpy interior surfaces between the affixed furnishings which is allowable within inexpensive truck camper shells, but which is unacceptable for expensive travel trailers and motorhomes where home-like smooth polished wood, vinyl, and fabric interior wall surfaces are the norm.

And, regardless of the vehicle body construction method, an internal steel or aluminum wall and floor frame is required to support the multitude of slideout room sections that are now common in the majority of newly manufactured RVs . . . most new RVs have two to three of these slideout rooms, with some having four and five slideout rooms.

Therefore a need exists in the industry for an extremely light weight one-piece "thin-skin" molded RV body that can be manufactured without a heavy steel chassis frame, and which construction method minimizes costly hand labor . . . while lending itself to automated assembly line manufacturing processes as used in the automotive and sport boat industries.

SUMMARY OF THE INVENTION

This invention relates to body construction for recreational vehicles, trailers, motorhomes, coaches, buses, vans, delivery trucks, sport utility vehicles (SUVs), sports cars, and sports trucks. This group of vehicle types will be herein after referred to as "Recreational Trailers" for clarity of examples, but this term shall include all aforementioned vehicle types.

In the Recreational Trailer construction of my invention herein disclosed, a thin outermost resin skin (about a 1/32" to 3/32" thick) is formed in an exterior mold that will yield a one-piece vehicle body. This thin outermost resin skin may be reinforced with suitable fibers such as glass, carbon, and Kevlar as suits the builder. Because this outermost skin is extremely thin, and thus is not self-supporting, it cannot be removed from the exterior mold without collapsing.

Into this outermost thin-skin within the mold is placed a pre-manufactured skeletal space frame structure that incorporates provisions for slideout rooms, wiring, HVAC ducts, plumbing, and other vehicle systems.

Pre-manufactured interior walls and ceiling elements are then placed within the skeletal space frame to form a second inner mold, with the aforementioned space frame residing between the exterior mold thin-skin and the surfaces of the inner mold.

Into the space between the outer mold and inner mold is injected a closed-cell polyurethane rigid-insulation foam (or other suitable construction insulation rigid foam) which bonds the components within the molds into a single monocoque structure. When the foam is cured and becomes rigid, the thin outermost resin skin (about a 1/32" to 3/32" thick) also becomes structurally rigid by virtue of its lamination to the rigid-insulation and to the inner skeletal space frame structure, and to the interior body inner molded surfaces. This thin-skin technology reduces the weight of the fiberglass shell by 30% to 50% over conventional self-supporting exoskeleton fiberglass body shells.

Moreover, the inner skeletal space frame structural members can be constructed of significantly lighter weight materials with thinner wall thickness (metal, plastics, fibers, etc.), because the structural members are encapsulated within the rigid foam which stiffens their thinner material walls, and stiffens their bonds to each other.

When cured, the finished body is removed from the exterior mold, and bonded to a similarly constructed one-piece molded body platform that serves as the vehicle chassis and the interior cabin floor where holding tanks, water tanks, and storage areas are molded within the body platform. The manufacturer may alternately combine the body mold and the platform mold into one unit in order to eliminate the process of bonding the finished parts together.

The completed assembly yields a thin-skin monolithic vehicle body that is ultra light and structurally strong . . . that can be molded nearly in any styling body shape . . . that eliminates the majority of fit and finish processes in the RV industry . . . and that can be manufactured with substantially lower labor costs.

An embodiment of this invention yields a streamlined aircraft type nose utilizing the exposed trailer frame tongue area between the front interior wall of the trailer and the area aft of the hitch, which streamlined shape reduces air turbulence for increased fuel economy, and which provides additional enclosed storage areas.

Further, the invention of this monolithic body makes possible the various embodiments herein where the recreational trailer has a smaller frontal area when traveling to reduce vehicle fuel consumption, and a higher profile to allow slideout rooms to pass over the tops of the road tires when parked.

And further, other embodiments yield a recreational trailer with an adjustable tongue weight, with pivoting road wheels to eliminate tire scrub with multi-axle units, steerable road wheels to enhance maneuverability, and a nose-wheel to lower tongue weight and eliminate leveling jacks.

BRIEF DESCRIPTION OF THE DRAWINGS

Other features and advantages of the present invention will be apparent from the following detailed descriptions of preferred embodiments thereof when read in conjunction with reference to the accompanying drawings, wherein:

FIG. 39 is a schematic top view illustration of the Recreational Trailer body platform, tires and suspension on the chassis relating to the area view in FIG. 2. Also shown is a caster-wheel, an A-arm component of the suspension, a tie rod, an actuator, and anchor points on the vehicle chassis.

FIG. 40 is a reduced-size schematic top view illustration as shown in FIG. 39, illustrating the actuator locked to the tie rod, and the wheels locked in a straight ahead position.

FIG. 41 is the same reduced-size schematic top view illustration as shown in FIG. 40, illustrating the actuator locked to the tie rod, and steering the wheels to the left.

FIG. 42 is the same reduced-size schematic top view illustration as shown in FIG. 40, illustrating the actuator locked to the tie rod, and steering the wheels to the right.

FIG. 43 is the same reduced-size schematic top view illustration as shown in FIG. 40, but illustrating the actuator unlocked from the tie rod, allowing the wheels to freely pivot.

FIG. 44 is the same reduced-size schematic top view illustration as shown in FIG. 43, with the actuator unlocked from the tie rod, and showing the wheels freely pivoting (castering) to the right.

FIG. 45 is the same reduced-size schematic top view illustration as shown in FIG. 43, with the actuator unlocked from the tie rod, and showing the wheels freely pivoting (castering) to the left.

DETAILED DESCRIPTION OF THE PREFERRED EMBODIMENTS

Figure 1:
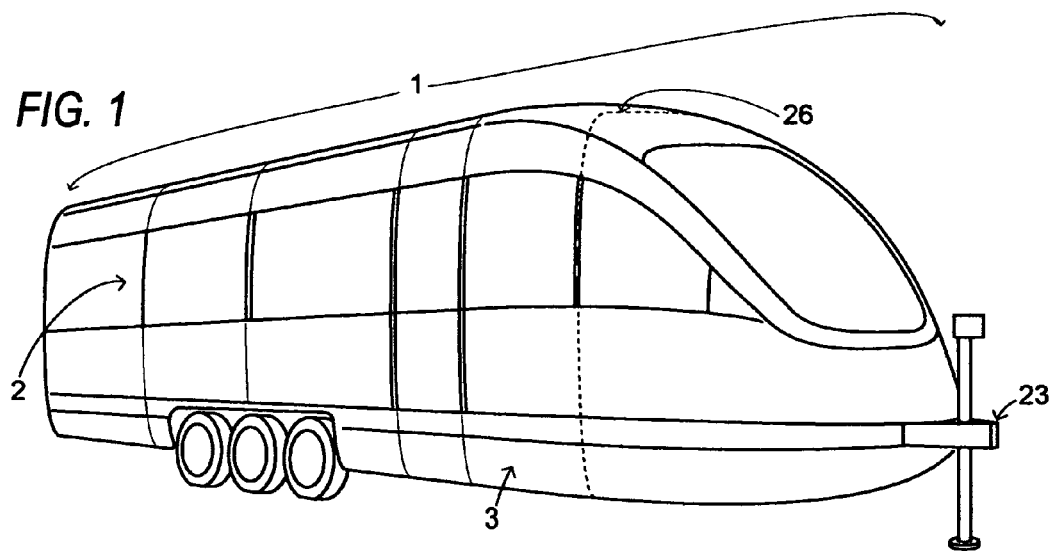
FIG. 1 is a perspective view of one embodiment of the invention depicting a representative molded fiberglass Recreational Trailer body.

FIG. 1 is a perspective view of one embodiment of the invention depicting a representative one-piece molded fiberglass Recreational Vehicle Trailer body 1. While this example shows a Recreational Travel body 2 for simplicity of illustration, the invention embodies all types of vehicle bodies and airframes, including motorhomes, coaches, travel trailers, fifth-wheel trailers, buses, trucks, delivery trucks, vans, automobiles, SUVs, and amphibians. The front end of this embodiment of the Recreational Trailer body, forward of broken section line 26, shows a streamlined storage nose cap utilizing the space above and below the concealed triangular tow frame, tongue, and hitch space at the front of the body. Commonly, traditional travel trailers end the front of the trailer body about three feet short of the hitch 23, leaving the triangular portion of the trailer chassis frame exposed between the hitch and the front of the trailer body. Below the body 2 is shown a molded body chassis platform 3.

Figure 2:
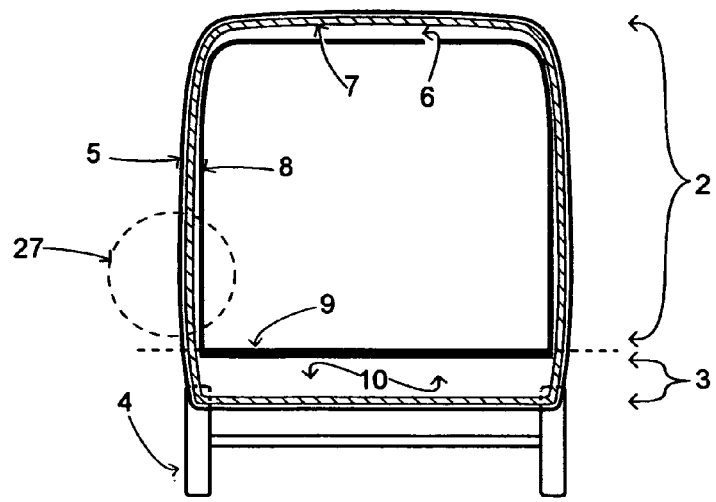
FIG. 2 is a typical midway cross section of the Recreational Trailer body illustrated in FIG. 1.

FIG. 2 is a typical midway cross section of the Recreational Trailer body illustrated in FIG. 1. Shown is the body 2 and the chassis platform 3 below it, with the vehicle wheels 4 below the chassis. The broken line circle 27 identifies the location of the section shown in FIG. 3. The exterior surface of the body 5 is an ultra-thin molded skin, over an injected molded structural insulation foam 6 enclosing a structural space frame 7, ending with an interior surface skin 8 forming the walls and the ceiling. Also shown is a floor 9, and a space below the floor 10.

Figure 3:
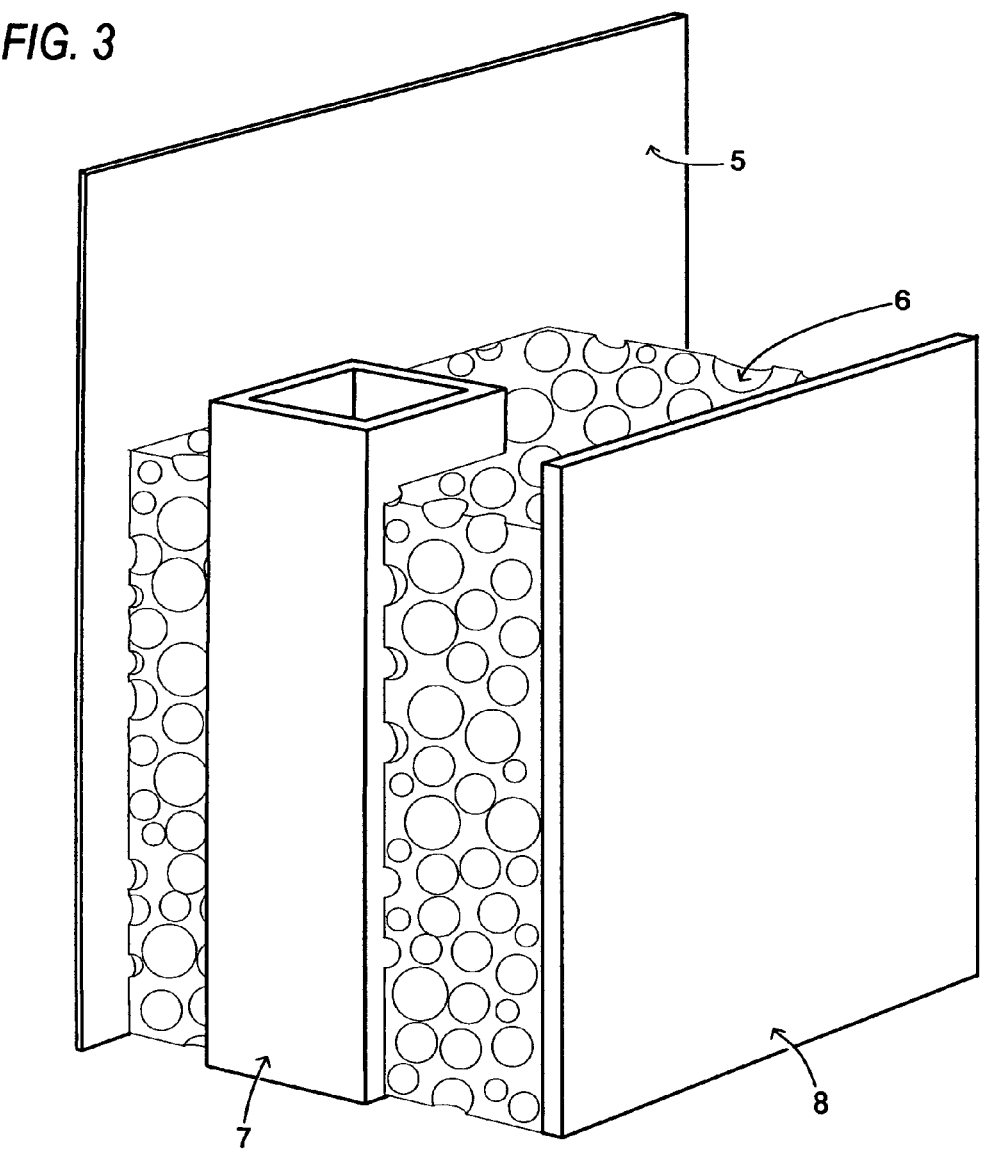
FIG. 3 is a perspective illustration of a sidewall section of the completed Recreational Trailer body of FIG. 2 at the area encircled with broken line 27, showing the thin outermost fiberglass exterior surface, the rigid foam core, the space frame, and the interior wall surface.

FIG. 3 is a perspective illustration of a sidewall section of the completed Recreational Trailer body of FIG. 2 at the area encircled with broken line 27, showing the ultra-thin outermost resin exterior surface 5, the rigid foam core 6, the space frame 7, and the interior wall surface 8. The ultra-thin outermost resin skin (about a $\frac{1}{32}$" to $\frac{3}{32}$" thick) 5 is not self-supporting without the structural support of the bonded rigid foam core 6 and the bonded space frame 7. The outermost resin skin maybe reinforced with suitable glass, carbon, and or Kevlar type fibers as needed by the manufacturer. The bonded foam separates the space frame from the outer skin, so that the space frame does not contact the skin causing stress areas from the expansion and contraction differential between the frame and the outer skin. And the foam encapsulates the interior space frame, structurally stiffening it, which allows lighter weight and thinner sections in the space frame structure. Similarly, the interior wall 8 is bonded to the rigid foam core 6 and the space frame 7.

Figure 4:
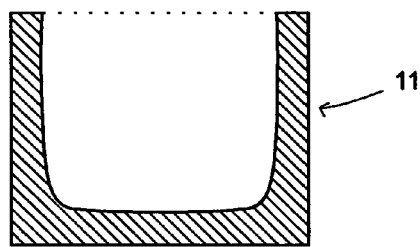
FIG. 4 is a typical midway cross section of an exterior mold used to produce the Recreational Trailer body 2 as illustrated in FIG. 2.

FIG. 4 is an illustrative typical midway cross section of an exterior mold used to produce the Recreational Trailer body as illustrated in FIG. 2. The mold 11 is shown with the open side in the upward position for simplicity of illustration, but in normal practice the mold may be rotated on its longitudinal axis for convenience of manufacturing. And while the mold is shown as a one-piece mold in this illustration, in manufacturing practice the mold may consist of a number of sub-molds which yield the finished part(s).

Figure 5:
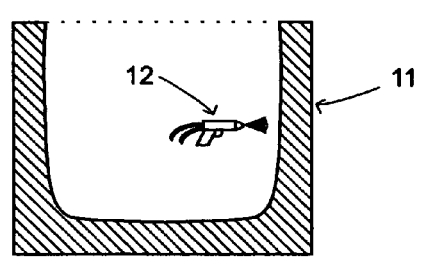
FIG. 5 is the same exterior mold shown in FIG. 4, with a thin layer of resin being applied to the interior of the exterior mold.

FIG. 5 is the same exterior mold 11 shown in FIG. 4, with a thin layer of resin being applied to the interior of the exterior mold with an application device 12. When the finished part is removed from the mold, the resin will be the exterior skin surface of the body. A typical resin of colored gel-coat or other suitable exterior moldable material becomes the exterior body surface.

Figure 6:
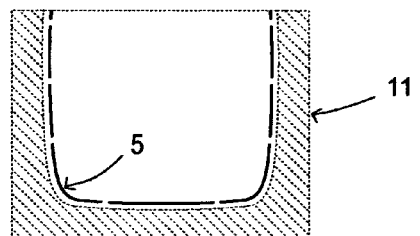
FIG. 6 is the same exterior mold shown in FIG. 4, with an optional thin layer of fiber reinforcement (fiberglass) applied to the interior of the exterior mold.

FIG. 6 is the same exterior mold 11 shown in FIG. 4, showing a cross sectional view of an optional thin layer of fiber (glass, carbon, Kevlar, or other suitable fiber) reinforcing the resin skin 5 in the mold 11. The fiber reinforcement may be resin with integral chopped filament applied with a pressure gun, and or hand applied mat and or cloths as required to produce the desired exterior surface skin. For convenience to the reader, hereinafter in the specification the outer skin material will be referred to as "fiberglass", regardless of the actual material and reinforcement used.

Figure 7:
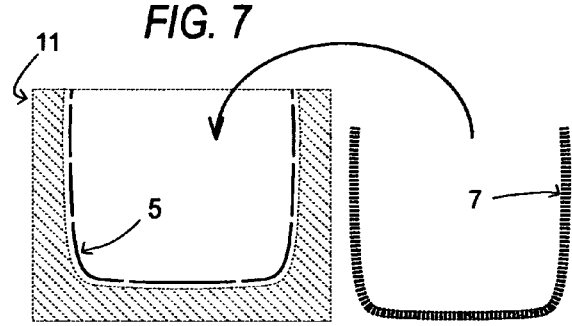
FIG. 7 is the exterior mold shown in FIG. 4, with the same thin layer of fiberglass in the exterior mold, and showing a pre-manufactured space frame sitting next to the exterior mold.

FIG. 7 is the exterior mold 11 shown in FIG. 4, with the same thin layer of fiberglass 5 in the exterior mold 11, and showing a cross sectional view of a pre-manufactured space frame 7 sitting next to the exterior mold. The material of the space frame 7 may be metal, as commonly used in recreation vehicles and racing cars, wood, or a fiberglass (glass, carbon, Kevlar, or other suitable fiber) space frame as suits the manufacturer.

Figure 8:
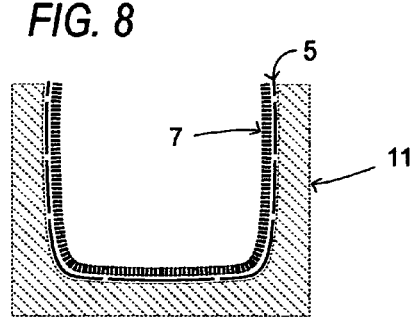
FIG. 8 is the exterior mold shown in FIG. 4, with the thin layer of fiberglass in the exterior mold, with the pre-manufactured space frame inserted in the exterior mold.

FIG. 8 is the exterior mold 11 shown in FIG. 4, with the thin layer of fiberglass 5 in the exterior mold 11, with the pre-manufactured space frame 7 inserted in the exterior mold 11. The space frame 7 is held by a suitable means from touching the fiberglass skin 5.

Figure 9:
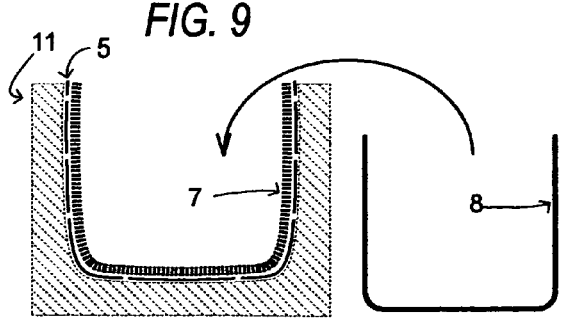
FIG. 9 is the exterior mold shown in FIG. 4, with the thin layer of fiberglass and the pre-manufactured space frame in the exterior mold, and showing a pre-manufactured interior assembly inner mold sitting next to the exterior mold.

FIG. 9 is the exterior mold 11 shown in FIG. 4, with the thin layer of fiberglass 5 and the pre-manufactured space frame 7 in the exterior mold 11, and showing a cross sectional view of a pre-manufactured interior assembly inner mold 8 sitting next to the exterior mold 11. The inner mold 8 forms the interior walls and ceiling of the body, which mold is left in the part when the body is completed.

Figure 10:
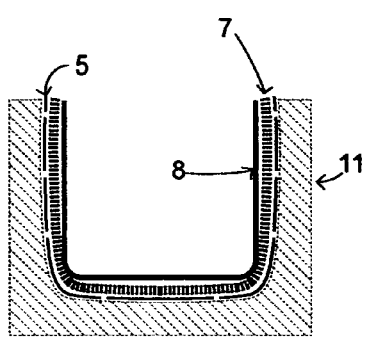
FIG. 10 is the exterior mold shown in FIG. 4, with the thin layer of fiberglass and the space frame in the mold, and with the pre-manufactured interior assembly inner mold inserted in the exterior mold.

FIG. 10 is the exterior mold 11 shown in FIG. 4, with the thin layer of fiberglass 5 and the space frame 7 in the mold 11, and with the pre-manufactured interior assembly inner mold 8 inserted in the exterior mold 11. The outer skin 5 and the inner mold 8 now form a continuous cavity for injection of the bonding insulation foam.

Figure 11:
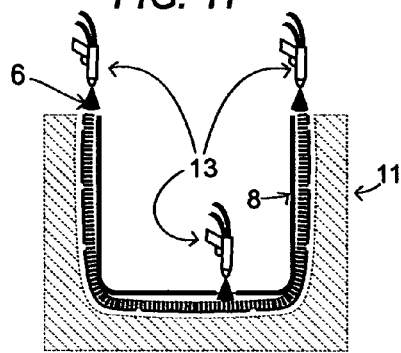
FIG. 11 is the exterior mold shown in FIG. 4, with the thin layer of fiberglass and the space frame and the interior assembly inner mold in the exterior mold, and showing rigid foam insulation being injected into the space between the exterior mold and the inner mold.

FIG. 11 is the exterior mold 11 shown in FIG. 4, with the thin layer of fiberglass 5 and the space frame 7 and the interior assembly inner mold 8 in the exterior mold 11, and showing rigid foam insulation 6 being injected 13 into the space between the exterior mold 11 and the inner mold 8. The injection 13 may also be done through openings in the inner mold 8 as required for manufacturing.

Figure 12:
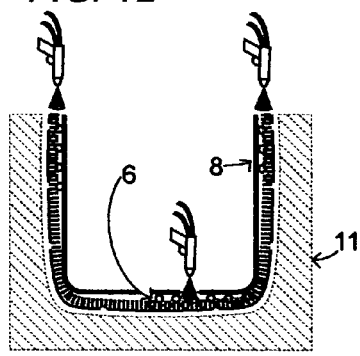
FIG. 12 is the exterior mold shown in FIG. 4, with the thin layer of fiberglass and the space frame and the interior assembly inner mold in the exterior mold, and showing rigid foam insulation bubbles partially expanding into the space between the exterior mold and the inner mold.

FIG. 12 is the exterior mold 11 shown in FIG. 4, with the thin layer of fiberglass 5 and the space frame 7 and the interior assembly inner mold 8 in the exterior mold 11, and showing rigid foam insulation bubbles 6 partially expanding into the space between the exterior mold and the inner mold.

Figure 13:
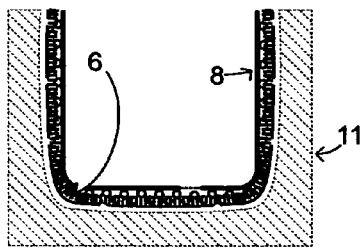
FIG. 13 is the exterior mold shown in FIG. 4, with the thin layer of fiberglass and the space frame and the interior assembly inner mold in the exterior mold, and showing rigid foam insulation bubbles fully expanded into the space between the exterior mold and the inner mold.

FIG. 13 is the exterior mold 11 shown in FIG. 4, with the thin layer of fiberglass 5 and the space frame 7 and the interior assembly inner mold 8 in the exterior mold 11, and showing rigid foam insulation bubbles 6 fully expanded into the space between the exterior mold and the inner mold.

Figure 14:
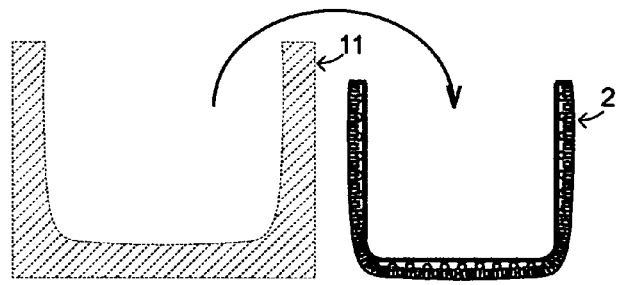
FIG. 14. is the exterior mold shown in FIG. 4, and showing the completed Recreational Trailer body part removed from the molds.

FIG. 14 is the exterior mold 11 shown in FIG. 4, and showing a cross sectional view of the completed Recreational Trailer body 2 removed from the molds.

Figure 15:
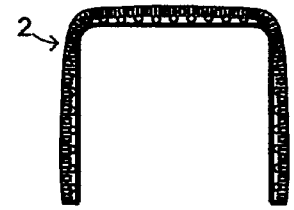
FIG. 15. is the completed Recreational Trailer body shown in FIG. 14, and showing it turned into the upright position.

FIG. 15 is the cross sectional view of completed Recreational Trailer body 2 shown in FIG. 14, but showing it turned in the upright position.

Figure 16:
FIG. 16. is a typical midway cross section of a bottom exterior mold used to produce the one-piece molded body platform of the Recreational Trailer body illustrated in FIG. 2.

FIG. 16 is a typical midway cross section of a bottom exterior mold 14 used to produce the one-piece molded body platform of the Recreational Trailer body illustrated in FIG. 2. The bottom exterior mold 14 is shown with the open side in the upward position for simplicity of illustration, but in normal practice the mold may be rotated on its longitudinal axis for convenience of manufacturing. And while the bottom exterior mold is shown as a one-piece mold in this illustration, in manufacturing practice the mold may consist of a number of sub-molds which yield the fininshed part(s). And for simplicity of illustration, the bottom exterior mold 14 is depicted as a mold separate from the exterior body mold 11, although they may be combined in order to eliminate later bonding of the body to the chassis platform.

Figure 17:
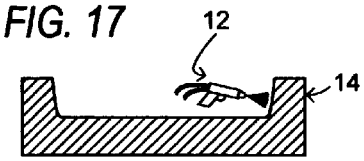
FIG. 17. is the same bottom exterior mold shown in FIG. 16, with a thin layer of resin being applied to the interior of the bottom exterior mold.

FIG. 17 is the same bottom exterior mold 14 shown in FIG. 16, with a thin layer of resin being applied to the interior of the bottom exterior mold 14 with an application device 12. When the finished part is removed from the mold, the resin will be the exterior skin surface of the one-piece molded body platform that serves as the vehicle chassis and the interior cabin floor where holding tanks, water tanks, and storage areas are molded within the body platform. A typical resin of colored gel-coat or other suitable exterior moldable material becomes the exterior body platform surface.

Figure 18:
FIG. 18 is the same bottom exterior mold shown in FIG. 16, with an optional thin layer of fiber reinforcement (fiberglass) in the interior of the bottom exterior mold.

FIG. 18 is the same bottom exterior mold 14 shown in FIG. 16, with a cross sectional view of an optional thin layer of fiber (glass, carbon, Kevlar, or other suitable fiber) reinforcing the resin 15 the interior of the bottom exterior mold 14. The fiber reinforcement may be resin with integral chopped filament applied with a pressure gun, and or hand applied mat and or cloths as required to produce the desired exterior surface skin. For convenience to the reader, in the specification the outer skin material is referred to as "fiberglass", regardless of the actual material used.

Figure 19:
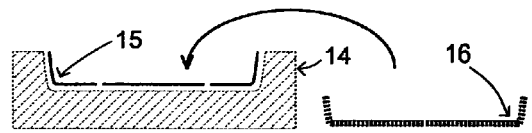
FIG. 19 is the bottom exterior mold shown in FIG. 16, with the same thin layer of fiberglass in the bottom exterior mold, and showing a pre-manufactured space frame chassis sitting next to the bottom exterior mold.

FIG. 19 is the bottom exterior mold 14 shown in FIG. 16, with the same thin layer of fiberglass 15 in the bottom exterior mold, and showing a cross sectional view of a pre-manufactured space frame chassis 16 sitting next to the bottom exterior mold 14.

Figure 20:
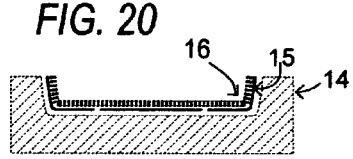
FIG. 20 is the bottom exterior mold shown in FIG. 16, with the thin layer of fiberglass in the bottom exterior mold, with the pre-manufactured space frame chassis inserted in the bottom exterior mold.

FIG. 20 is the bottom exterior mold 14 shown in FIG. 16, with the thin layer of fiberglass 15 in the bottom exterior mold 14, with the pre-manufactured space frame chassis 16 inserted in the bottom exterior mold 14.

Figure 21:
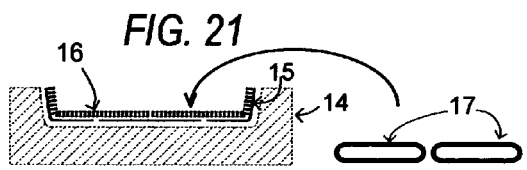
FIG. 21 is the bottom exterior mold shown in FIG. 16, with the thin layer of fiberglass and the pre-manufactured space frame chassis in the exterior mold, and showing a set of pre-manufactured water tanks sitting next to the bottom exterior mold.

FIG. 21 is the bottom exterior mold 14 shown in FIG. 16, with the thin layer of fiberglass 15 and the pre-manufactured space frame chassis 16 in the exterior mold 14, and showing a cross sectional view of a set of pre-manufactured water tanks 17 sitting next to the bottom exterior mold. For simplicity within this specification, the tanks are referred to as water tanks, but in manufacturing practice, the type of tanks includes gray water holding tanks, black water (sewage) holding tanks, fuel tanks, and other types of tanks as needed for the vehicle. In addition, or in the place of the illustrated tanks, pre-manufactured boxes for storage with through the floor or through exterior door access are similarly used as needed for the vehicle.

Figure 22:
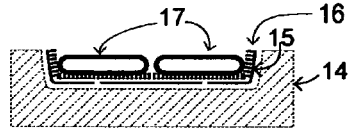
FIG. 22 is the bottom exterior mold shown in FIG. 16, with the thin layer of fiberglass and the pre-manufactured space frame chassis in the exterior mold, and showing the water tanks inserted to the bottom exterior mold.

FIG. 22 is the bottom exterior mold 14 shown in FIG. 16, with the thin layer of fiberglass 15 and the pre-manufactured space frame chassis 16 in the exterior mold 14, and showing the water tanks 17 inserted in the bottom exterior mold 14.

Figure 23:
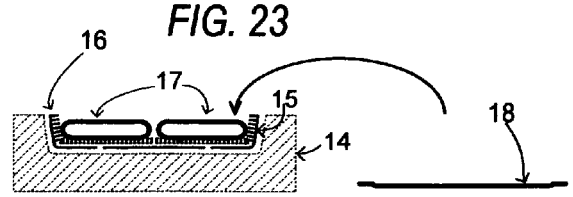
FIG. 23 is the bottom exterior mold shown in FIG. 16, with the thin layer of fiberglass and the space frame and the tanks in the mold, and with a pre-manufactured interior floor inner mold sitting next to the bottom exterior mold.

FIG. 23 is the bottom exterior mold 14 shown in FIG. 16, with the thin layer of fiberglass 15 and the space frame 16 and the tanks 17 in the mold 14, and a cross sectional view of a pre-manufactured interior floor inner mold 18 sitting next to the bottom exterior mold 14.

Figure 24:
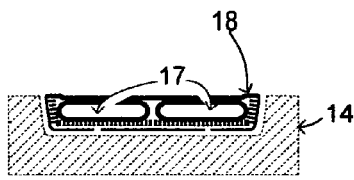
FIG. 24 is the bottom exterior mold shown in FIG. 16, with the thin layer of fiberglass and the space frame and the tanks in the mold, and with the pre-manufactured interior floor inner mold inserted in the bottom exterior mold.

FIG. 24 is the bottom exterior mold 14 shown in FIG. 16, with the thin layer of fiberglass and the space frame and the tanks 17 in the mold 14, and with the pre-manufactured interior floor inner mold 18 inserted in the bottom exterior mold 14.

Figure 25:
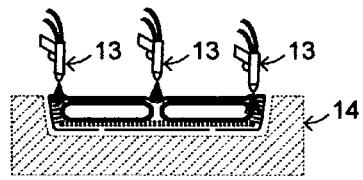
FIG. 25 is the bottom exterior mold shown in FIG. 16, with the thin layer of fiberglass and the space frame and the interior floor inner mold in the bottom exterior mold, and showing rigid foam insulation being injected into the space between the bottom exterior mold and the interior floor inner mold.

FIG. 25 is the bottom exterior mold 14 shown in FIG. 16, with the thin layer of fiberglass and the space frame and the interior floor inner mold in the bottom exterior mold 14, and showing rigid foam insulation being injected 13 into the space between the bottom exterior mold 14 and the interior floor inner mold.

Figure 26:
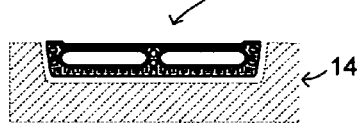
FIG. 26 is the bottom exterior mold shown in FIG. 16, and showing a completed one-piece molded body platform part within the molds.

FIG. 26 is the bottom exterior mold 14 shown in FIG. 16, and showing a completed one-piece molded body platform 3 within the mold 14.

Figure 27:
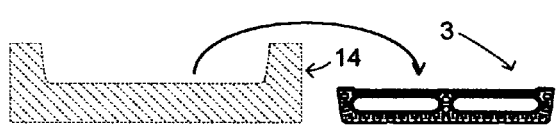
FIG. 27 is the bottom exterior mold shown in FIG. 16, and showing the completed body platform removed from the molds.

FIG. 27 is the bottom exterior mold 14 shown in FIG. 16, and showing a cross sectional view of the completed body platform 3 removed from the mold 14.

Figure 28:
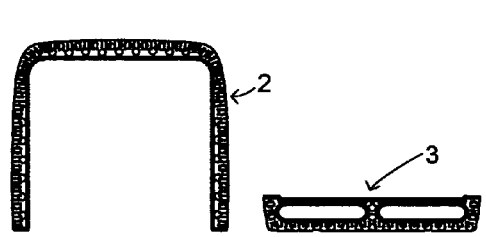
FIG. 28 is a view of the completed body platform of FIG. 27 and the completed Recreational Trailer body shown in FIG. 15 sitting next to each other.

FIG. 28 is a cross sectional view of the completed body platform 3 of FIG. 27 and the completed Recreational Trailer body 2 shown in FIG. 15 sitting next to each other.

Figure 29:
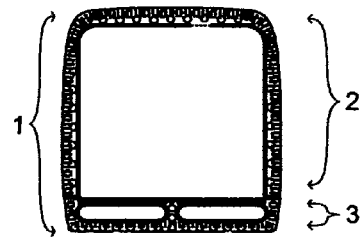
FIG. 29 is a view of the completed body platform and the completed Recreational Trailer body shown in FIG. 28 bonded to each other.

FIG. 29 is a cross sectional view of the body platform 3 and the Recreational Trailer body 2 shown in FIG. 28 bonded to each other forming a one-piece recreational vehicle body 1.

Figure 30:
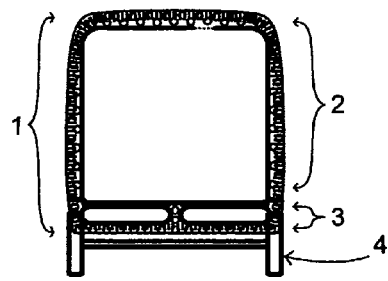
FIG. 30 is a view of the completed body platform and the completed Recreational Trailer body structure shown in FIG. 29, with road wheels in place.

FIG. 30 is a cross sectional view of the completed body platform 3 and the completed Recreational Trailer body 2 structure shown in FIG. 29, with road wheels 4 in place.

Figure 31:
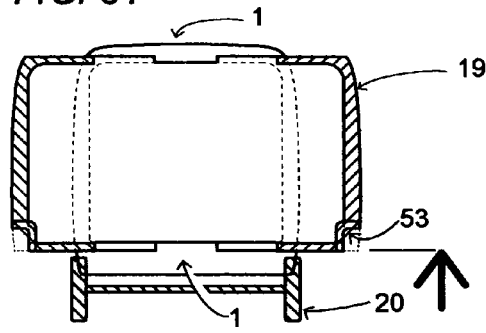
FIG. 31 is a typical midway cross section of the Recreational Trailer body illustrated in FIG. 1, showing slideouts from my U.S. Pat. No. 6,679,543 Recreational Vehicle Full-Length Slideout System in the open position, with the body raised above the wheels.

FIG. 31 is a typical midway cross section of the one-piece recreational vehicle body 1 illustrated in FIG. 1 and is a similar view to FIG. 2, but showing a slideout expanding room 19 from my U.S. Pat. No. 6,679,543 Recreational Vehicle Full-Length Slideout System in the open position (extended from the body position) with the one-piece recreational vehicle body 1 raised above a variable-height suspension system 20 as conceptually depicted in my previous application Ser. No. 10/712,227. With the body 1 in the raised position above the variable-height suspension system 20, the slideout 19 extends outwardly above the vehicle tires. Also shown are the inner fenders 53 in the slideout. While the illustration of the variable-height suspension system shows a trailing arm 21 in this embodiment, the variable-height system can be embodied with A-arms, struts, or other suitable suspension means within the scope of this invention with its purpose to lift the slideouts above the vehicle tires for use, and to lower the vehicle body closer to the road for travel.

Figure 32:
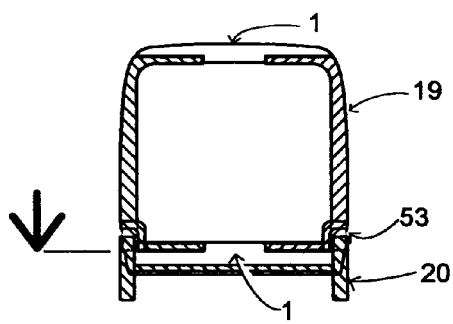
FIG. 32 is the same midway cross section shown in FIG. 31, with the slideouts in the closed position, and the body in the lowered position for travel.

FIG. 32 is the same midway cross section shown in FIG. 31, but showing the slideout expandable room(s) 19 in the closed position, and the vehicle body 1 in the lowered position for travel. In this lowered position, the vehicle tires recess into inner fenders 53 within the slideout when the vehicle is traveling. Previous to this invention, recreational vehicles with slideouts located over the wheels, required additional vehicle height to allow for the opening and closing of the slideouts, without interfering with the vehicle wheels. This increased height of conventional slideout equipped recreation vehicles increases the frontal area of the vehicle, requiring more power and fuel to travel at the same speed as an equivalent weight vehicle of a lower, smaller frontal area. The essence of this invention is that a slideout equipped recreational vehicle, utilizing the variable-height wheel suspension system of this invention, will decrease its frontal area when traveling, thereby lowering fuel consumption. And when parked, the variable-height wheel suspension system raises the vehicle to a conventional height for use of the slideouts.

Figure 33:
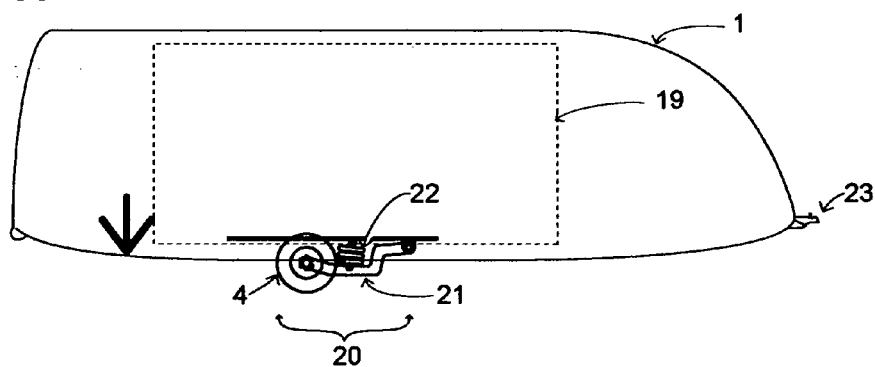
FIG. 33 is the exterior schematic side view of the same Recreational Trailer body shown in FIG. 32, showing the same slideout in broken line, and showing the body in a lowered position on the wheel suspension system for travel.

FIG. 33 is the exterior schematic side view of the same one-piece recreational vehicle body 1 shown in FIG. 32, showing the same slideout 19 in broken line, and showing the body 1 in a lowered position on the variable-height wheel suspension system 20 for travel. Shown at the front of the vehicle is the trailer hitch 23. For illustrative purposes of the variable-height wheel suspension system, a trailing arm type suspension is shown, where the trailing arm 21 is pivoted from the vehicle chassis on its forward end, and has a vehicle wheel 4 on its trailing end. In this embodiment of the invention, the trailing arm is sprung from the chassis with an air-bag type spring 22, whereby the residual air in the bag is maintained at a low level for road travel, thus lowering the height of the vehicle body above the road. An optional metal augmentation spring can also be used in conjunction with the air-bag to provide a sprung suspension in the event of an air-bag leak.

Figure 34:
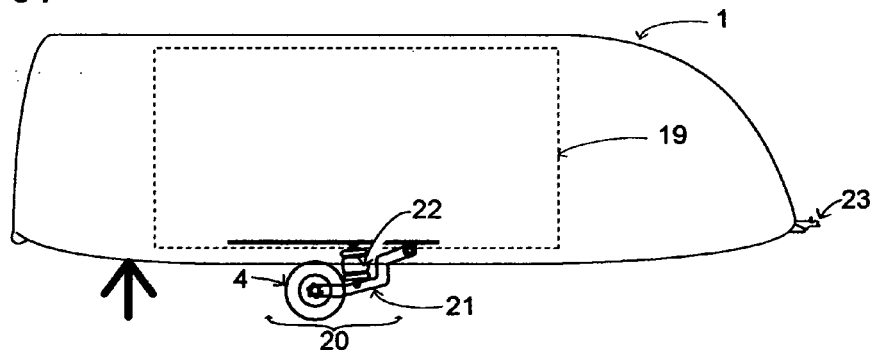
FIG. 34 is the exterior schematic side view of the same Recreational Trailer body shown in FIG. 31, showing the same slideout in broken line, and showing the body in a raised position on the wheel suspension system to allow the slideouts to extend outward above the wheels.

FIG. 34 is the exterior schematic side view of the same vehicle body 1 shown in FIG. 31, showing the same slideout in broken line 19, and showing the body 1 in a raised position on the variable-height wheel suspension system 20 to allow the slideouts 19 to extend outward from the vehicle body above the wheels 4. In this illustration, the air-bag spring 22 residual air in the bag is maintained at a high level to allow the use of the slideout, thus raising the height of the vehicle body so that the slideout(s) clear the tops of the tires when extended from the body. Hydraulic, electric, or other suitable suspension lifting units can be utilized with the scope of this invention.

Figure 35:
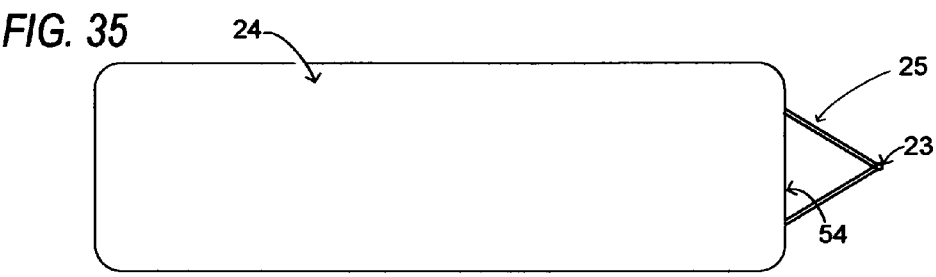
FIG. 35 is a schematic top view example of a traditional travel trailer, showing the top of the trailer body and showing the triangular tow frame-hitch at the front of the body.

FIG. 35 is a schematic top view of a traditional travel trailer, showing the top of the trailer body 24 and showing the triangular tow frame 25 and hitch 23 at the front of the body. This illustration shows the typically flat front section 54 of a traditional trailer, and unused space between the front surface 54 of the trailer and the area above the triangular tow frame behind the hitch.

Figure 36:
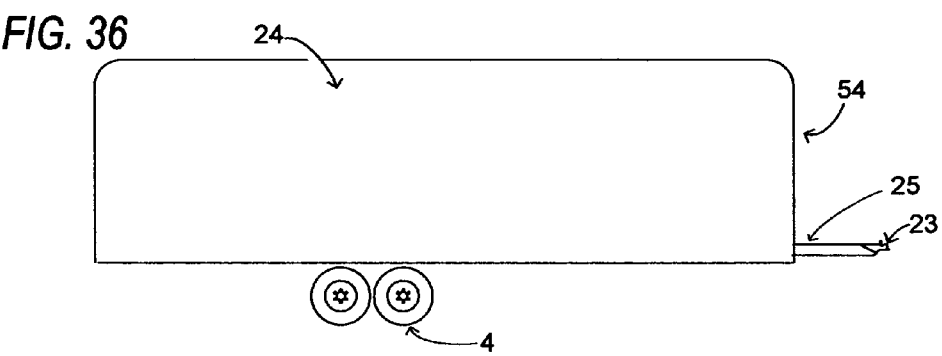
FIG. 36 is a schematic side view of the same traditional travel trailer example shown in FIG. 35, showing the side of the trailer body and showing the side of the tow frame, tongue, and hitch at the front of the trailer.

FIG. 36 is a schematic side view of the same traditional travel trailer shown in FIG. 35, showing the side of the trailer body 24 with a typically flat front surface 54, and showing the side of the tow frame 25, the hitch 23 at the front of the trailer, and the wheels 4 under the body.

Figure 37:
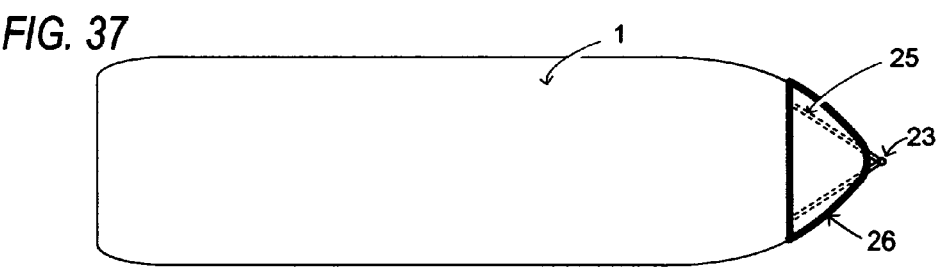
FIG. 37 is a schematic top view of the Recreational Trailer body illustrated in FIG. 1, showing the top of the trailer body, and showing a streamlined storage nose cap utilizing the triangular tow frame, tongue, and hitch space at the front of the body.

FIG. 37 is a schematic top view of the Recreational Trailer body illustrated in FIG. 1, showing the top of the trailer body 1, and showing a streamlined storage nose cap 26 utilizing the triangular tow frame 25 space at the front of the body. Also shown is the hitch 23. The streamlined storage nose cap 26 provides enclosed storage for propane tanks, and or a battery, and or a generator, and or storage of items as selected by the user. And the streamlined shape of storage nose cap, like the nose of an aircraft, reduces the air turbulence and drag caused by the blunt flat front shapes of conventional trailers, and smoothes the air flow around the vehicle to lower air resistance, which in turn lowers the power and fuel required to tow the vehicle.

Figure 38:
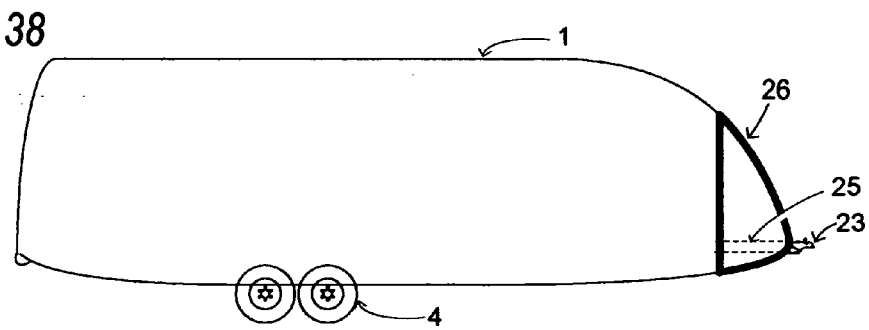
FIG. 38 is a schematic side view of the Recreational Trailer body illustrated in FIG. 37, showing the side of the trailer body, and showing the streamlined storage nose cap utilizing the space above and below the triangular tow frame, tongue, and hitch space at the front of the body.

FIG. 38 is a schematic side view of the Recreational Trailer body illustrated in FIG. 37, showing the side view of the trailer body 1, and showing the streamlined storage nose cap 26 utilizing the space above and below the triangular tow frame 25. The hitch 23 is shown at the front of the body.

FIG. 39 is a schematic top view illustration of the Recreational Trailer body platform at the area of the tires and suspension relating to cross section view in FIG. 2, but showing an A-arm 31 type suspension attached to the vehicle chassis 32, and showing pivoting road wheels 4 . . . much like the front steering suspension of a typical automobile. The A-arm is another embodiment of the variable-height suspension system of FIGS. 31 through 34, where in this embodiment the A-arm suspension 31 allows the wheel hub 29 to pivot. Of essence in this part of the invention, the pivot point 30 is located well forward of the centerline of the wheel hub 29, allowing the road wheel 4 to act like a conventional caster that automatically follows the direction of the vehicle, much like the caster wheels on a shopping cart follow the direction the shopping cart's travel. A steering tie rod 34 joins to the rear 33 of the wheel hub 29 on one side of the vehicle to the wheel hub 39 on the opposite side of the vehicle, so that the wheels on both sides of the trailer turn in unison. A remote controlled actuator 36 with and extending and retracting arm 38 with a locking latch 39 at the end of the arm 38, is remotely lockable to the mating latch 37 on the steering tie rod 34. Any suitable latching means may be used within the scope of this invention. When the remote controlled actuator 36 is locked to the steering tie rod 34, the position of the actuator extending arm 38 determines the position of the road wheels 4. The Locked-On and Locked-Off position of the locking latch 39 and the mating latch 37 is remotely controlled from the tow vehicle. In the Locked-On, the wheels can be locked in the straight-ahead position like a convention trailer, or they can be remotely steered by an electrical actuator direction-control-switch located in the tow vehicle or in an elsewhere suitable location. In the Locked-Off position, the road wheels 4 freely pivot (caster) when traveling.

FIG. 40 is a reduced-size schematic top view illustration as shown in FIG. 39, illustrating the actuator 36 locked to the tie rod 34, and the wheels 4 locked in a straight-ahead position.

FIG. 41 is the same reduced-size schematic top view illustration as shown in FIG. 40, illustrating the actuator 36 locked to the tie rod 34, and steering the wheels 4 to the left.

FIG. 42 is the same reduced-size schematic top view illustration as shown in FIG. 40, illustrating the actuator 36 locked to the tie rod 34, and steering the wheels 4 to the right.

FIG. 43 is the same reduced-size schematic top view illustration as shown in FIG. 40, but illustrating the actuator 36 unlocked from the tie rod 34, allowing the wheels 4 to freely pivot.

FIG. 44 is the same reduced-size schematic top view illustration as shown in FIG. 43, with the actuator 36 unlocked from the tie rod 34, and showing the wheels 4 freely pivoting (castering) to the right following the direction of the vehicle.

FIG. 45 is the same reduced-size schematic top view illustration as shown in FIG. 43, with the actuator 36 unlocked from the tie rod 34, and showing the wheels 4 freely pivoting (castering) to the left following the direction of the vehicle.

Figure 46:
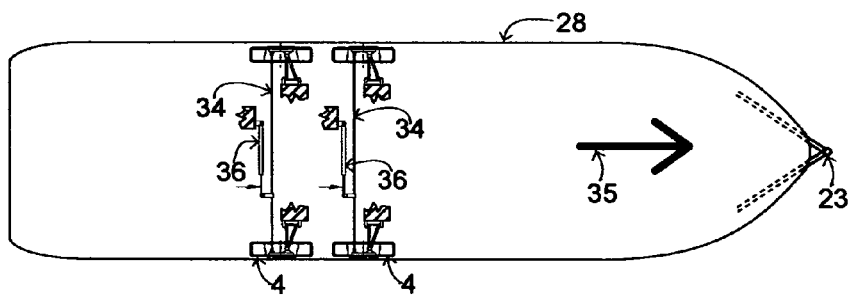
FIG. 46 is a schematic top view of a trailer as similarly shown in FIG. 37, showing two sets of the caster and steering wheel suspension units shown in FIG. 40, illustrating the actuators locked to the tie rods, and the caster-wheels locked in a straight ahead position.

FIG. 46 is a schematic top view of a trailer 28 as similarly shown in FIG. 37, showing two sets of the caster and steering wheel suspension units depicted in FIG. 40, illustrating the actuators 36 locked to the tie rods 34, and the wheels 4 locked in a straight-ahead position. Arrow 35 depicts the forward travel direction of the trailer. While only two sets of the caster and steering wheel suspension units are depicted for simplicity, the invention encompasses a lesser or a greater number of caster and steering wheel suspension unit sets as necessary for the trailer.

Figure 47:
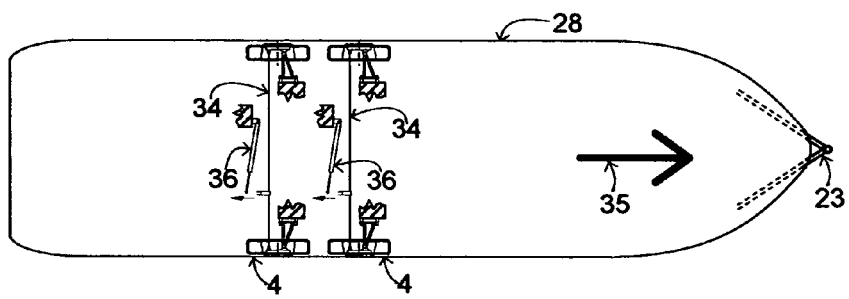
FIG. 47 is a schematic top view of a trailer as shown in FIG. 46, showing two sets of the caster and steering wheel suspension units shown in FIG. 43, illustrating the actuators unlocked from the tie rods allowing the wheels to freely pivot (caster).

FIG. 47 is the same schematic top view of the trailer 28 shown in FIG. 46, but showing two sets of the caster and steering wheel suspension units depicted in FIG. 43, which illustrates the actuators 36 unlocked from the tie rods 34 allowing the wheels to freely pivot (caster).

Figure 48:
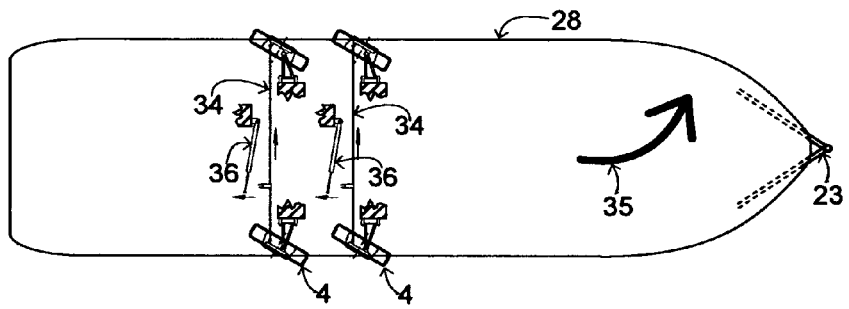
FIG. 48 is a schematic top view of a trailer as shown in FIG. 47, showing two sets of the caster and steering wheel suspension units shown in FIG. 44, illustrating the actuators unlocked from the tie rods, and showing the wheels freely pivoting (castering) to the right.

FIG. 48 is the same schematic top view of the trailer 28 shown in FIG. 47, showing the two sets of the caster and steering wheel suspension units (commonly referred to as dual or tandem axles) as depicted in FIG. 44 with the actuators 36 unlocked from the tie rods 34, and showing the wheels 4 freely pivoting (castering) to the right following the track of the leftward turning trailer. Arrow 35 depicts the leftward forward travel direction of the trailer.

Dual, triple, and quad axles on trailers were developed to help spread the vehicle load over the chassis—which they do well, but they cause excessive wear when the trailer makes turns, because the trailer tends to pivot on the tires of the forward axle. This causes a lateral scrub that creates excessive wear, literally "scrubbing" the tread off of the tires on the following axles. In extreme cases, it shears the tire tread completely off causing significant danger.

With all the tires automatically pivoting in the track of the turning trailer, tire scrub is substantially eliminated which improves safety while making the tires last longer.

Figure 49:
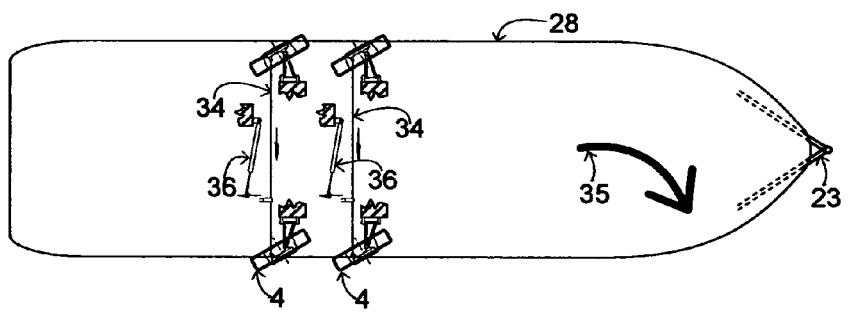
FIG. 49 is a schematic top view of a trailer as shown in FIG. 47, showing two sets of the caster and steering wheel suspension units shown in FIG. 45, illustrating the actuators unlocked from the tie rods, and showing the wheels freely pivoting (castering) to the left.

FIG. 49 is the same schematic top view of the trailer 28 shown in FIG. 48, but showing the wheels 4 freely pivoting (castering) to the left following the track of the rightward turning trailer. Arrow 35 depicts the rightward forward travel direction of the trailer.

Figure 50:
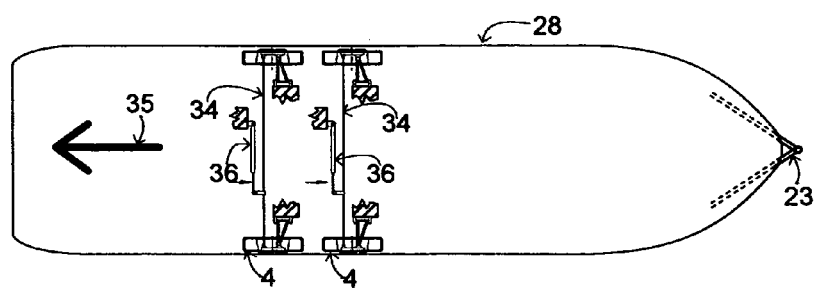
FIG. 50 is the same schematic top view of a trailer as shown in FIG. 46, showing the two sets of the caster and steering wheel suspension units locked in a straight ahead position, and showing the trailer traveling backward.

FIG. 50 is the same schematic top view of the trailer 28 as shown in FIG. 46, showing the two sets of the caster and steering wheel suspension units locked in a straight-ahead position (and straight rear position), but showing the trailer backing up in the direction of arrow 35.

Figure 51:
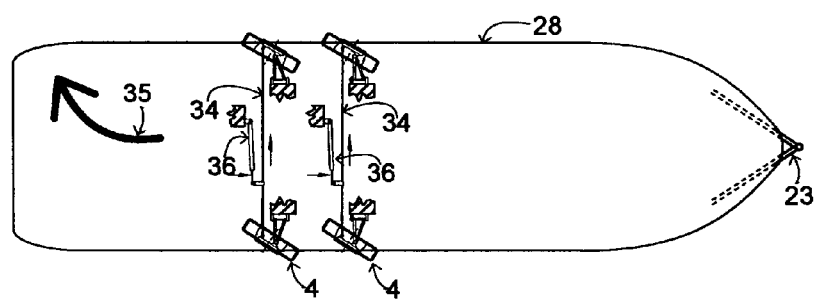
FIG. 51 is the same schematic top view of a trailer as shown in FIG. 50, showing the two sets of the caster and steering wheel suspension units locked to the actuators, and showing the wheels being steered in order to back the trailer to the left.

FIG. 51 is the same schematic top view of a trailer 28 as shown in FIG. 50 with the two sets of the caster and steering wheel suspension units locked to the actuators 36, and showing the wheels 4 being steered to the right. Activating the remote electrical actuator direction-control-switch in the tow vehicle causes the actuator 36 to pull the steering tie rod 34 which turns the wheels, causing the trailer to back leftward in the direction of arrow 35. With steerable wheels on the trailer, maneuverability of the backing trailer is greatly enhanced in difficult parking areas.

Figure 52:
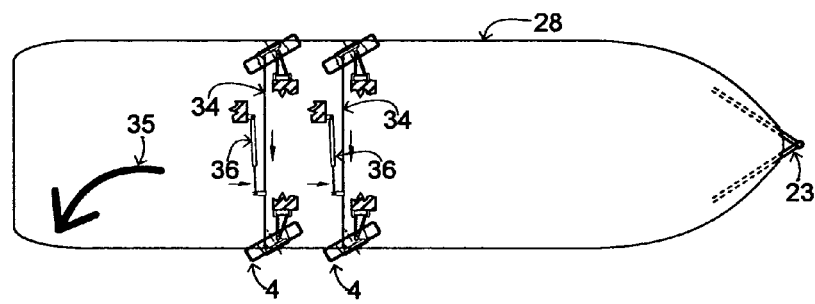
FIG. 52 is the same schematic top view of a trailer as shown in FIG. 46, showing the two sets of the caster and steering wheel suspension units locked to the actuators, and showing the wheels being steered in order to back the trailer to the right.

FIG. 52 is the same schematic top view of a trailer 28 as shown in FIG. 51, but showing the wheels being steered to cause the trailer to back rightward in the direction of arrow 35.

Figure 53:
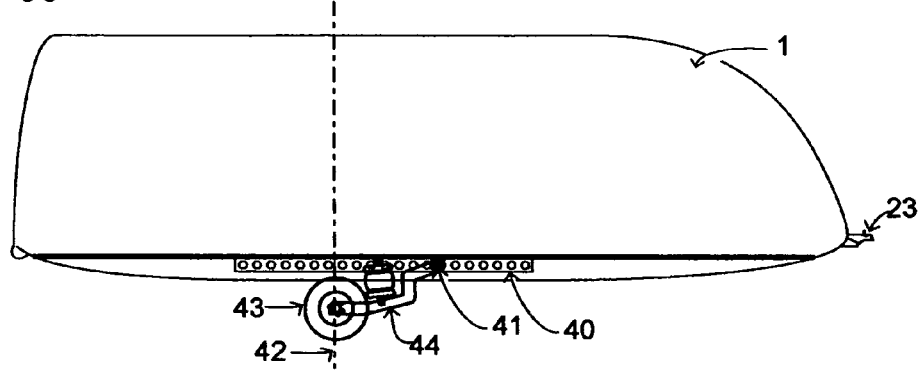
FIG. 53 is a typical side view illustration of the Recreational Trailer body shown in FIG. 1, and also similar to the side view shown in FIG. 34, but showing an adjustable tongue weight suspension system with the wheels located under a broken datum center line to illustrate the operation of the system.

FIG. 53 is a typical side view illustration of the Recreational Trailer body shown in FIG. 1, and also similar to the side view shown in FIG. 34, but showing an adjustable tongue weight suspension system with the wheels located under a broken datum center line to illustrate the operation of the system. Automobiles, SUVs, and pickup trucks capable of pulling a trailer have a maximum tongue weight (the downward weight the trailer hitch transfers to the rear end of the tow vehicle) which the tow vehicle's suspension can pull safely. Generally, smaller tow vehicles require correspondingly lower tongue weight trailers.

The tongue weight of a trailer is substantially determined by the lateral location of the axle(s) on the bottom of the trailers, much like a teeter totter balances on a fulcrum point. With recreational trailers, the fulcrum point is located above the axle(s). The closer the axle(s) is located toward the rear of the trailer, the more trailer tongue weight is transferred to the front hitch of the trailer. The closer the axle(s) is located toward the front of the trailer, the less downward tongue weight is transferred to the rear of the tow vehicle. The lateral location of the axle on recreational trailers is fixed to the trailer chassis at the time of manufacture of the chassis for ease of manufacturing. In the main, recreational trailer manufacturers utilize pre-manufactured trailer chassis (with the axle already fixed in its location), and then fit upon the chassis trailer various bodies with a variety of interior floor plans. For example, one floor plan on the chassis may have the heavy-weight kitchen located in the rear of the trailer, while another floor plan on the same chassis will have the heavy-weight kitchen located at the front of the trailer. The weight distribution of a trailer varies with the location of the kitchen, sleeping, dining, and living areas, the location of the water tank, the gray water tank, and the black water sewage tank, and with optional equipment of slideouts, generators, fireplaces, and is further affected by weight and location of personal equipment, food, and belongings stored within and on top of the trailer. This changing distribution of weight within the trailer, uncontrollably changes the tongue weight of the trailer.

In this embodiment of the invention, a typical trailer body 1 is shown with its chassis exposed for illustrative purposes, showing the hitch 23 at the front of the trailer, a variable suspension attachment point chassis section 40 (illustratively depicted with a multiplicity of holes along its length), a locking pin (bolt) 41 securing the trailer suspension 44 at various points along the chassis section 40, which location determines the location of the wheel(s) 43, and for illustrative purposes, shows a broken datum center line 42 running vertically through the initial location of the wheel and axle.

Figure 54:
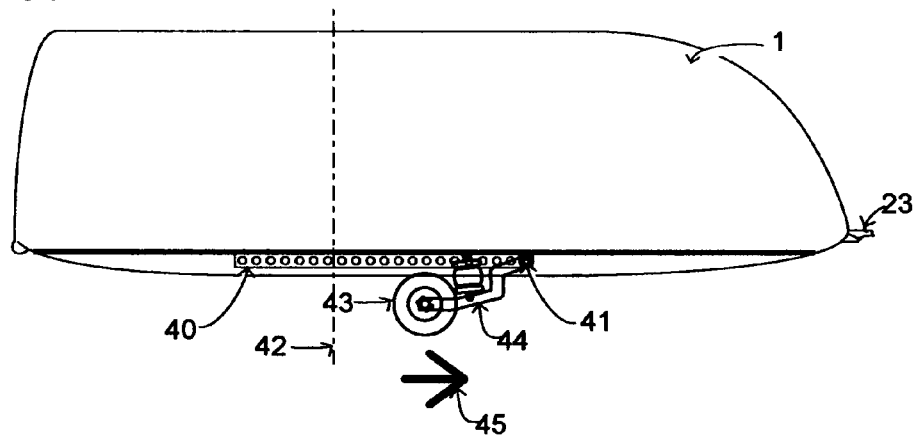
FIG. 54 is the same side view illustration of the Recreational Trailer body shown in FIG. 53, but showing the adjustable tongue weight suspension system with the wheels located forward of the broken datum center line.

FIG. 54 is the same side view illustration of the Recreational Trailer body shown in FIG. 53, but showing the adjustable tongue weight suspension system with the wheel(s) 43 located forward of the broken datum center line 42, and with an arrow 45 showing the direction the wheels have moved from the datum line 42. In this illustration, the new location of the wheels forward of the datum line reduces the tongue weight at the trailer hitch 23, while increasing the proportion of the weight at the rear of the trailer.

The relocation of the suspension 44 latterly along the chassis is accomplished during manufacturing, by assembling the suspension to the optimum point along the variable suspension attachment chassis section 40. Post manufacturing relocation of the suspension along the chassis is accomplished by lifting the chassis high enough from the ground to allow the suspension to slide in the desired direction on the chassis. On-the-road adjustment is made by unlocking the pin 41 from the chassis section 40, followed by application of the trailers brakes which retains the wheels 43 and suspension 44 on the road, while the trailer is backed rearward or driven forward. This process slides the trailer body 1 and chassis section 40 backwards or forward upon the wheels 43.

When the trailer is located in the optimum position on the chassis section 40, the lock pin 41 secures the suspension to it new position on the trailer.

Figure 55:
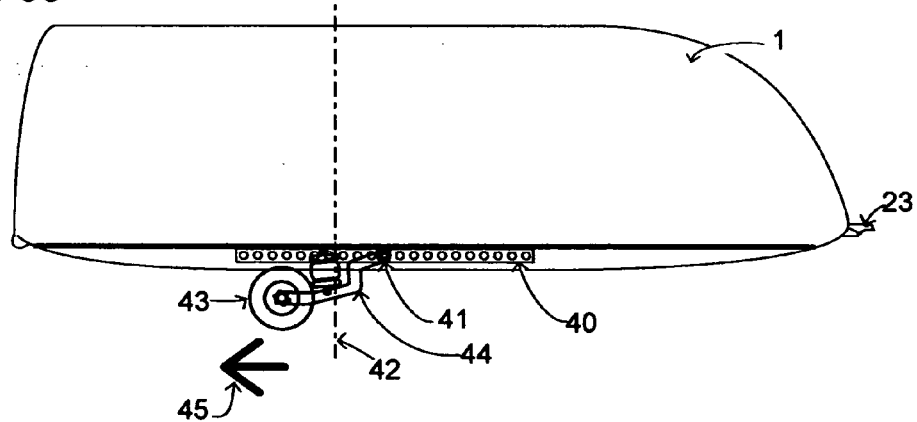
FIG. 55 is the same side view illustration of the Recreational Trailer body shown in FIG. 53, but showing the adjustable tongue weight suspension system with the wheels located rearward of the broken datum center line.

FIG. 55 is the same side view illustration of the Recreational Trailer body shown in FIG. 53, but showing the adjustable tongue weight suspension system with the wheels 43 located rearward of the broken datum center line 42, which increases the tongue weight on the trailer hitch 23.

Figure 56:
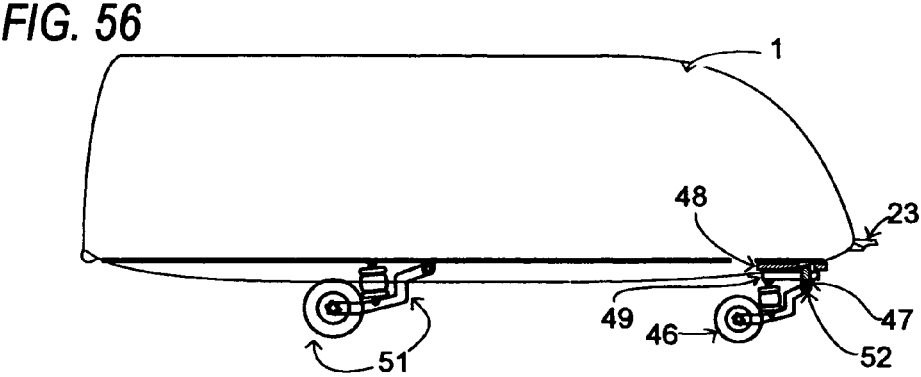
FIG. 56 is a typical side view illustration of the Recreational Trailer body shown in FIG. 1 and is similar to the side view shown in FIG. 34, showing a typical suspension system located under the mid-area of the trailer, but also showing a load bearing pivoting sprung wheel located at the forward-area of the trailer.

FIG. 56 is a typical side view illustration of the Recreational Trailer body shown in FIG. 1, showing a typical suspension system 51 located under the mid-area of the trailer 1, and a load bearing pivoting sprung wheel 46 located at the forward-area of the trailer. The load-bearing pivoting sprung wheel 46 is similar to the front wheel arrangement commonly seen on aircraft, and carries a portion of the frontal weight of the trailer, which substantially lowers the tongue weight of the hitch 23. In this embodiment, for illustrative purposes, the load-bearing pivoting sprung wheel 46 moves vertically by means of a hinge point 52, but any suitable means to accomplish the vertical sprung movement is within the scope of this invention, including shock-absorbing air-oleo struts, and adjustable-height load-bearing type shock absorbers. The suspension assembly freely pivots on a horizontal plane, allowing the suspension to follow the direction of the trailer's travel. In this illustration, the horizontal plane pivoting operation is by the means of a vertical axle 47 which permits the top of the suspension system 49 to freely turn below a suitable fixture at the front of the trailer. The use of any suitable means to allow the front wheel suspension to freely caster is within the scope of this invention. Additional features of this system allows the tow vehicle to be easily disconnected or attached by utilization of a variable-height wheel suspension as disclosed in FIG. 31, which raises the trailer hitch above the hitch ball on the tow vehicle. And similarly, the parked trailer can be leveled by adjusting the variable height of the suspension.

Figure 57:
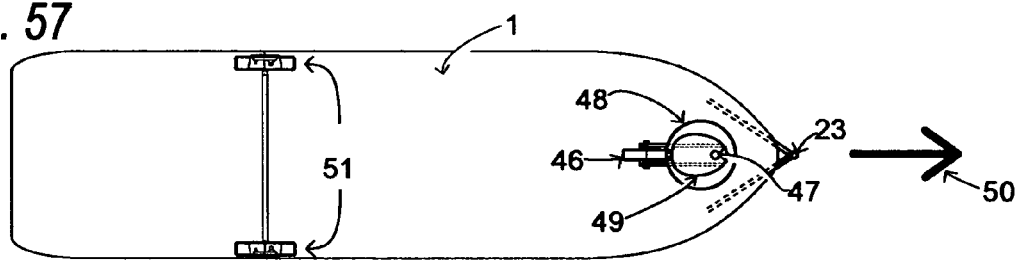
FIG. 57 is a schematic top view of FIG. 56 showing the mid-area suspension and the forward-area load bearing pivoting sprung wheel within the foot print of a trailer body, and showing the pivoting sprung wheel in the straight ahead position.

FIG. 57 is a schematic bottom view of the mid-area suspension 51 and the forward-area load bearing pivoting sprung wheel 46 within the foot print of a trailer body 1, and showing the pivoting sprung wheel 46 in the straight ahead position as indicated by arrow 50.

Figure 58:
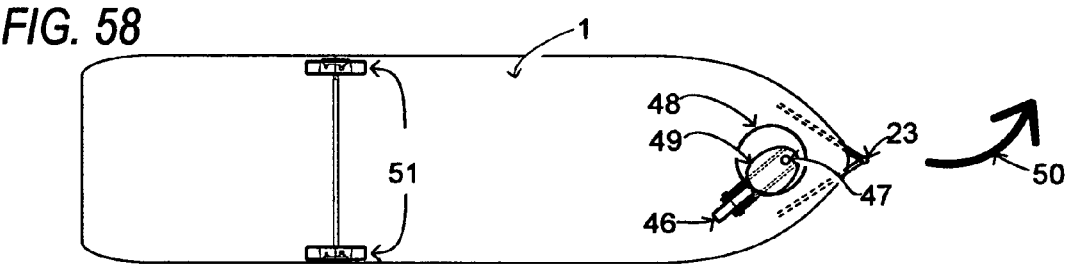
FIG. 58 is the same schematic top view illustrated in FIG. 57, but showing the pivoting sprung wheel following the leftward direction of the turning trailer.

FIG. 58 is the same schematic bottom view illustrated in FIG. 57, but showing the load bearing pivoting sprung wheel 46 following the rightward direction of the turning trailer as indicated by arrow 50.

Figure 59:
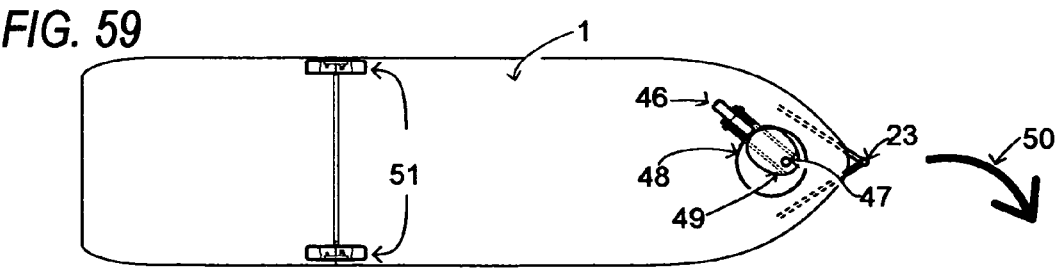
FIG. 59 is the same schematic top view illustrated in FIG. 57, but showing the pivoting sprung wheel following the rightward direction of the turning trailer.

FIG. 59 is the same schematic bottom view illustrated in FIG. 57, but showing the load bearing pivoting sprung wheel 46 following the leftward direction of the turning trailer as indicated by arrow 50.

I claim:

1. A molded recreational vehicle body comprising:
   an exterior resin thin-skin;
   interior surface skin forming the walls and ceiling;
   a structural space frame positioned in between the interior surface skin and exterior skin forming the skeleton of the vehicle body; and
   structural insulation foam adhering the exterior skin, the space frame, and the interior surface into a single monolithic vehicle body.

2. The molded recreational vehicle body of claim 1, wherein the vehicle body includes a multiplicity of internally molded tanks and compartments for liquids and for storage.

3. The molded recreational vehicle body of claim 1, wherein a slideout expanding room has an inner fender(s) to allow the slideout room floor to descend below the tops of the road wheels for travel.

4. The molded recreational vehicle body of claim 1, wherein the vehicle suspension height lowers for travel, and raises when parked to allow the slideout room(s) to pass over the tops of the road wheels.

5. The molded recreational vehicle body of claim 1, wherein a streamlined molded fairing above the triangular trailer frame tongue occupies the area from the front body wall of the trailer to a place near the rear of the trailer hitch.

6. The molded recreational vehicle body of claim 1, wherein the vehicle road wheels freely pivot to follow the track of the trailer through turns and curves.

7. The molded recreational vehicle body of claim 1, wherein the vehicle road wheels also are steerable.

8. The molded recreational vehicle body of claim 1, wherein the vehicle road wheels are longitudinally relocatable under the chassis to move the suspension fulcrum point forward or aft to change the trailer tongue weight.

9. The molded recreational vehicle body of claim 1, wherein a load-bearing pivoting sprung nose-wheel is located under the front of the trailer to minimize tongue weight transference to a tow vehicle.

10. The molded recreational vehicle body of claim 1, wherein the vehicle is a travel trailer, a fifth-wheel trailer, a motorhome, a coach, a bus, a truck, a delivery vehicle, an SUV, or an automobile.

11. The molded recreational vehicle body of claim 1, wherein a metal chassis with an affixed floor, suspension, and towing frame is joined to the vehicle body.

12. The molded recreational vehicle body of claim 1, wherein the molded body also includes a molded vehicle platform with an affixed suspension and towing frame.

13. The molded recreational vehicle body of claim 1, wherein the vehicle platform includes a molded floor.

* * * * *